(No Model.) 6 Sheets—Sheet 1.

J. ORTEGA Y ESPINOSA.
ELECTRIC RAILWAY SIGNAL.

No. 511,131. Patented Dec. 19, 1893.

WITNESSES:
Jos. A. Ryan
Edw. H. Byrn

INVENTOR
José Ortega Y Espinosa
BY Munn & Co
ATTORNEYS.

(No Model.) 6 Sheets—Sheet 2.

J. ORTEGA Y ESPINOSA.
ELECTRIC RAILWAY SIGNAL.

No. 511,131. Patented Dec. 19, 1893.

WITNESSES.
Fred J. Dieterich
Edw. W. Byrn.

INVENTOR
José Ortega Y Espinosa
By Munn & Co
ATTORNEYS (No Model.) 6 Sheets—Sheet 3.

J. ORTEGA Y ESPINOSA.
ELECTRIC RAILWAY SIGNAL.

No. 511,131. Patented Dec. 19, 1893.

WITNESSES
Fred G. Dieterich
Edw. W. Byrn

INVENTOR
José Ortega y Espinosa
By Munn & Co
ATTORNEYS (No Model.) 6 Sheets—Sheet 4.

J. ORTEGA Y ESPINOSA.
ELECTRIC RAILWAY SIGNAL.

No. 511,131. Patented Dec. 19, 1893.

(No Model.) 6 Sheets—Sheet 5.
J. ORTEGA Y ESPINOSA.
ELECTRIC RAILWAY SIGNAL.
No. 511,131. Patented Dec. 19, 1893.
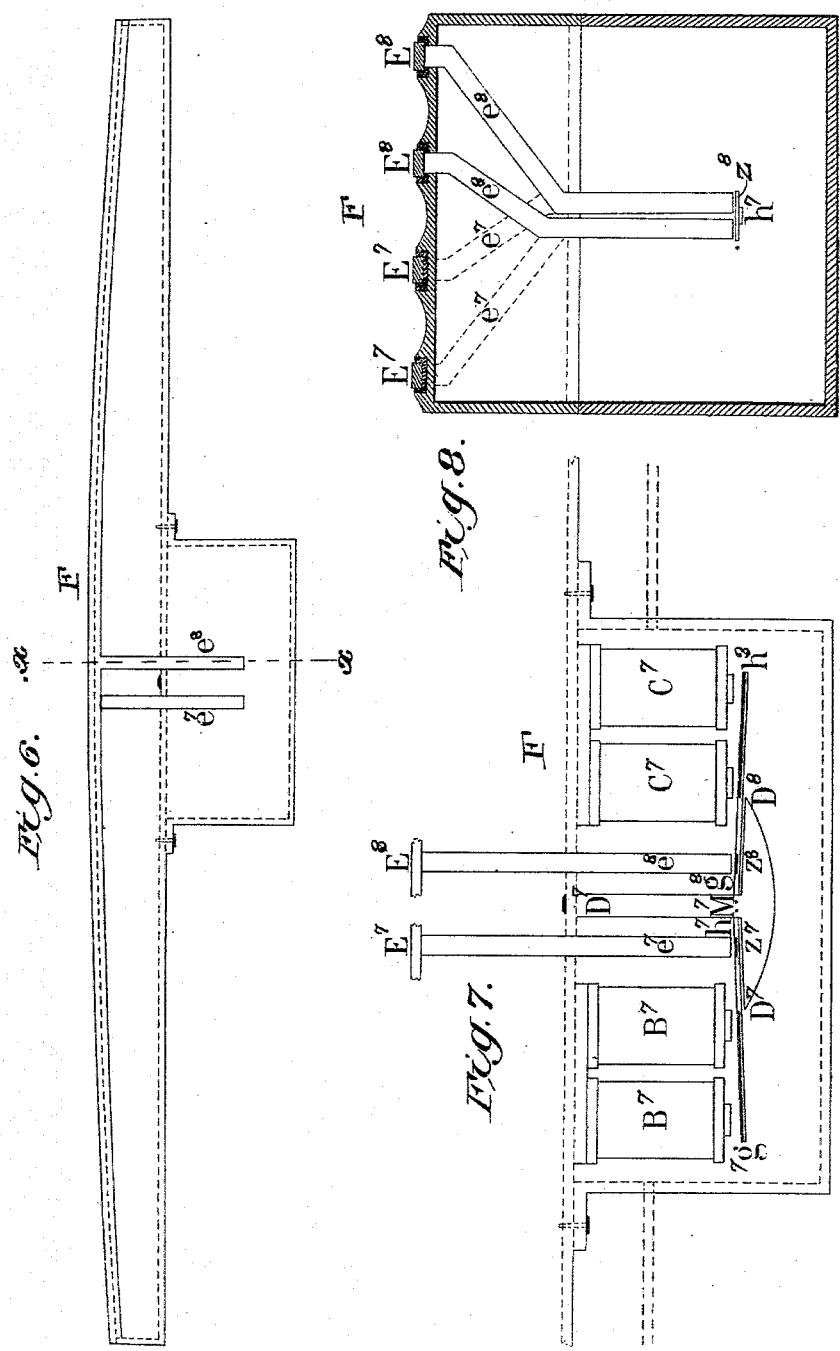
WITNESSES
Fred J. Dieterich
Edw. W. Byrn.
INVENTOR
José Ortega Y Espinosa
By
ATTORNEYS (No Model.) 6 Sheets—Sheet 6.
J. ORTEGA Y ESPINOSA.
ELECTRIC RAILWAY SIGNAL.
No. 511,131. Patented Dec. 19, 1893.
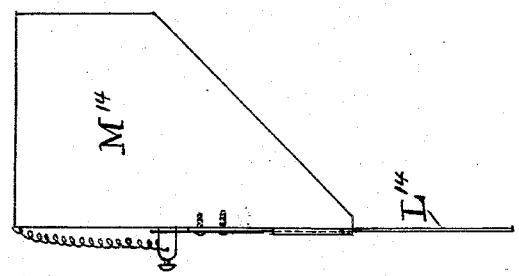
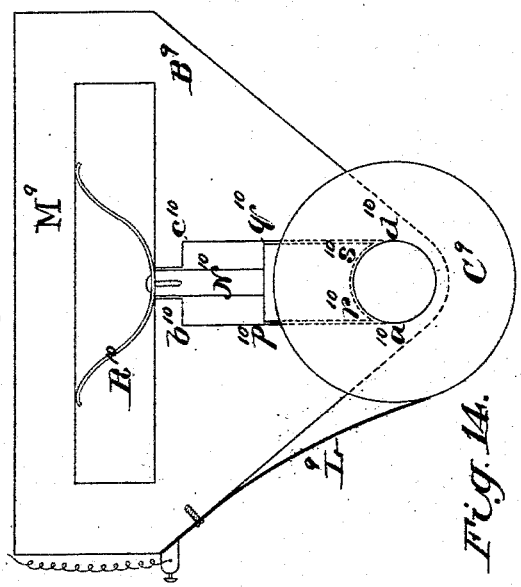
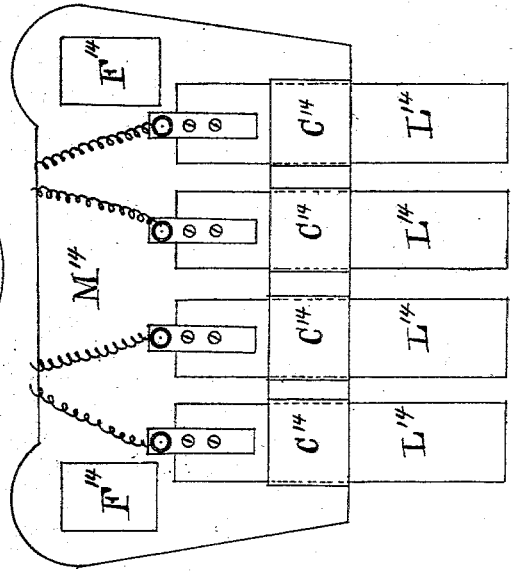
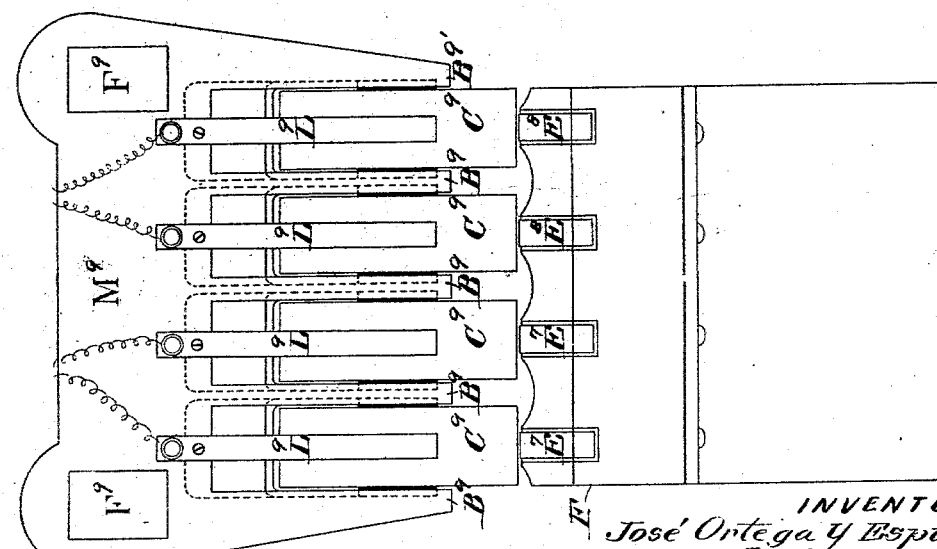
WITNESSES
Fred J. Dieterich
Edw. W. Byrn
INVENTOR
José Ortega Y Espinosa
By Munn & Co.
ATTORNEYS

UNITED STATES PATENT OFFICE.

JOSÉ ORTEGA Y ESPINOSA, OF MEXICO, MEXICO.

ELECTRIC RAILWAY-SIGNAL.

SPECIFICATION forming part of Letters Patent No. 511,131, dated December 19, 1893.

Application filed October 26, 1891. Serial No. 409,929. (No model.)

*To all whom it may concern:*

Be it known that I, JOSÉ ORTEGA Y ESPINOSA, residing at the city of Mexico, in the Republic of Mexico, have invented a new and useful Improvement in Electric-Railway Signals, of which the following is a specification.

The object of the invention is to prevent the collision of trains that come over the same road and in opposite directions. In obtaining this object, my invention by a special system of electrical apparatus, notifies not only the extreme stations of a portion of a road, but also the engine that runs over said road, that another engine is coming in an opposite direction. To well understand the manner in which this is obtained I will go on to explain in particular and successively each one of the features of the invention that form the complete system.

Figure 1:
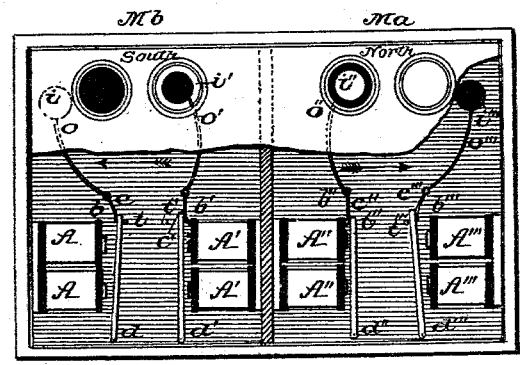
Figure 11:
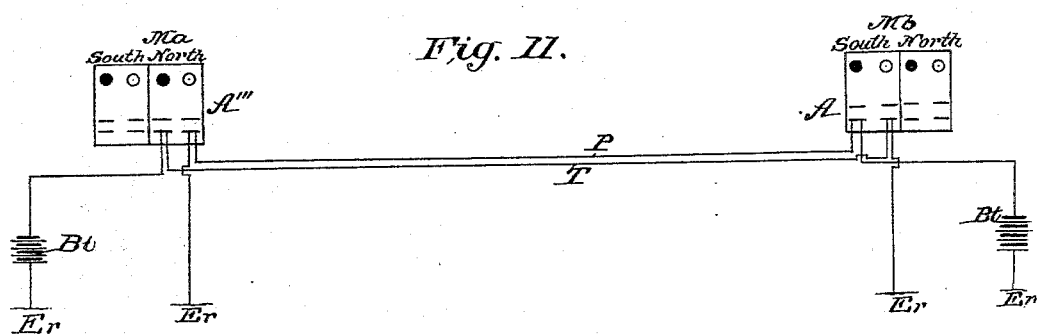
Figure 12:
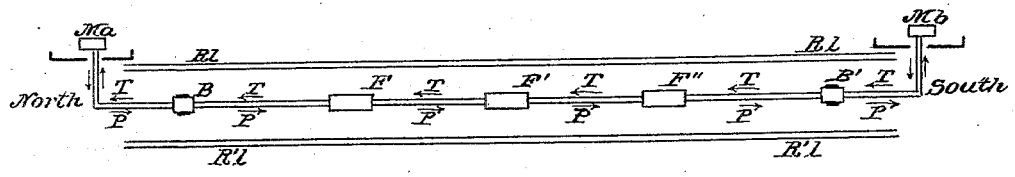
Figure 13:
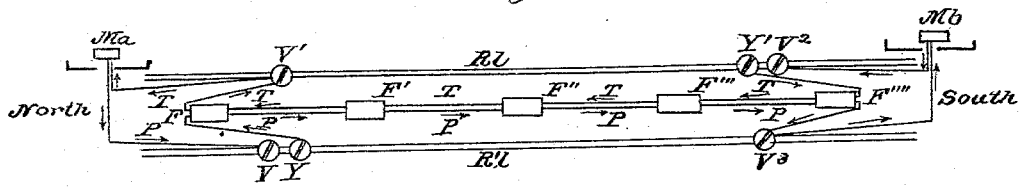
Figure 2:
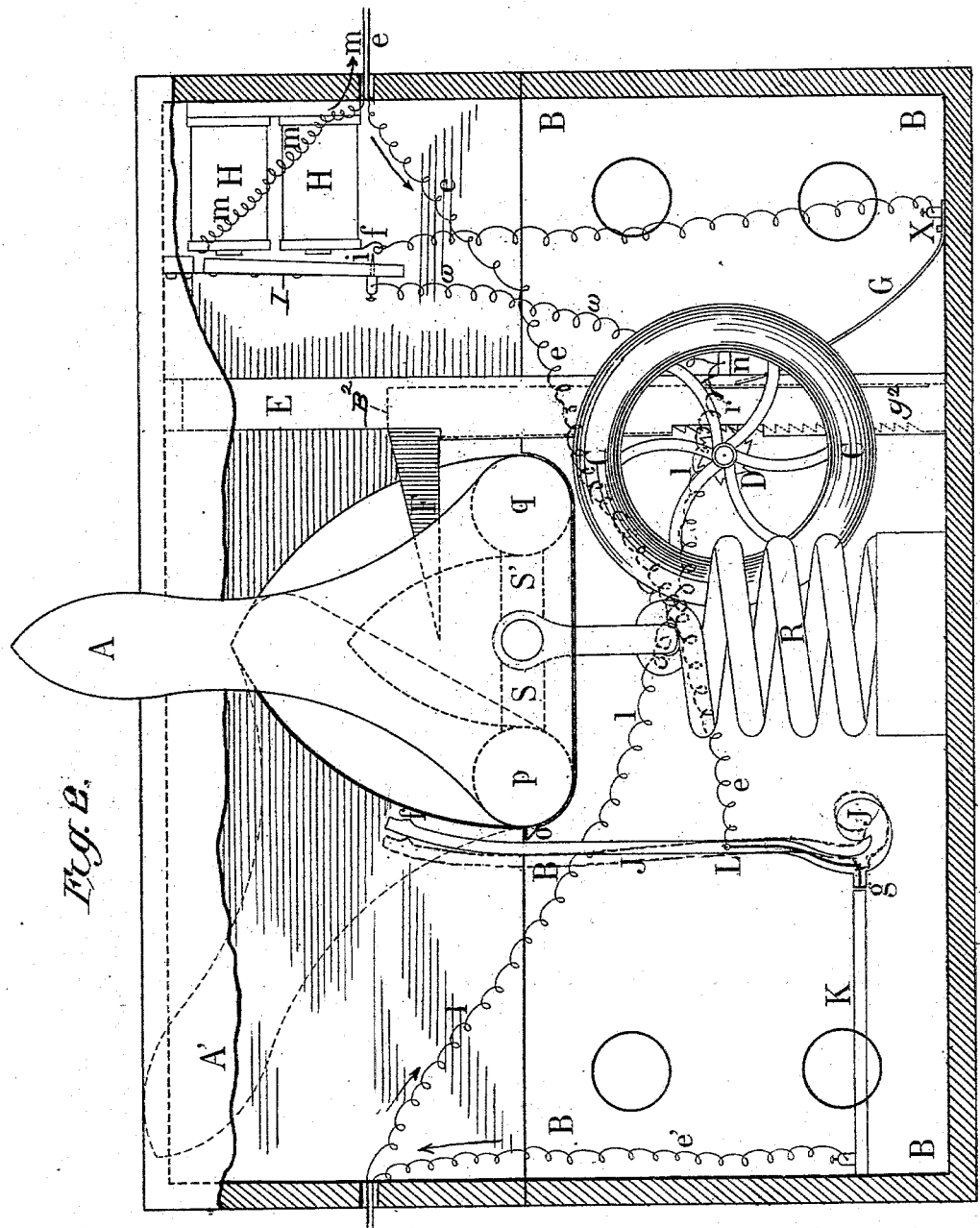
Figure 3:
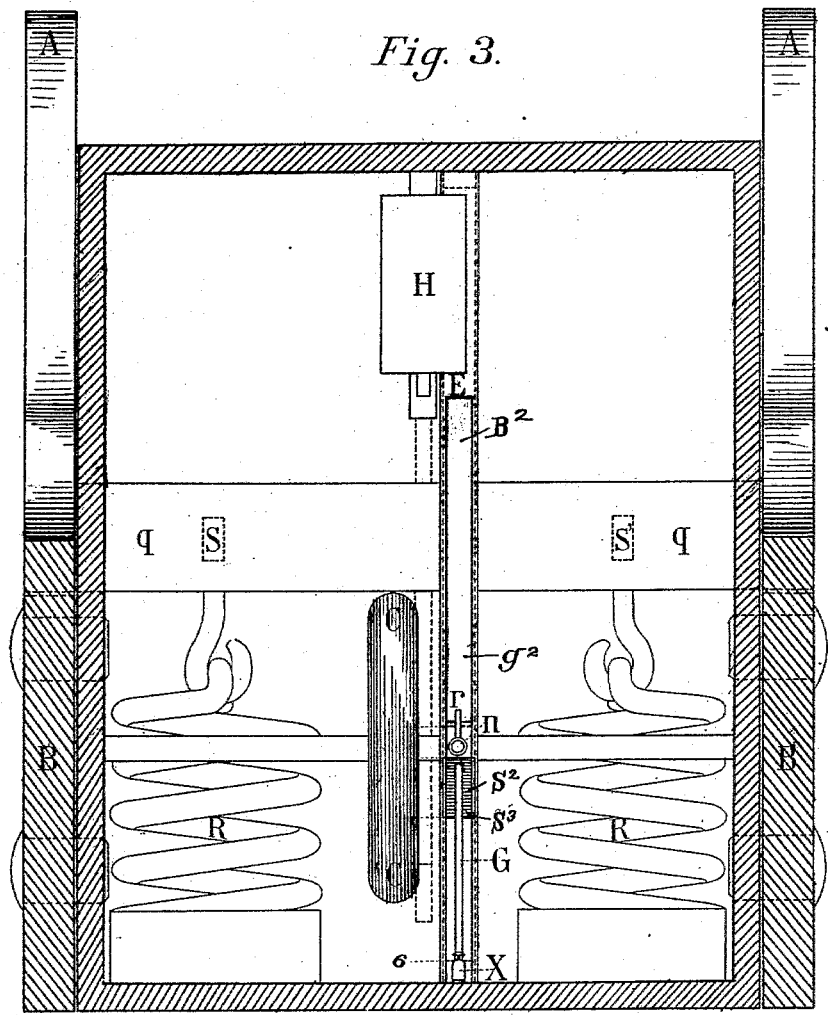
Figure 4:
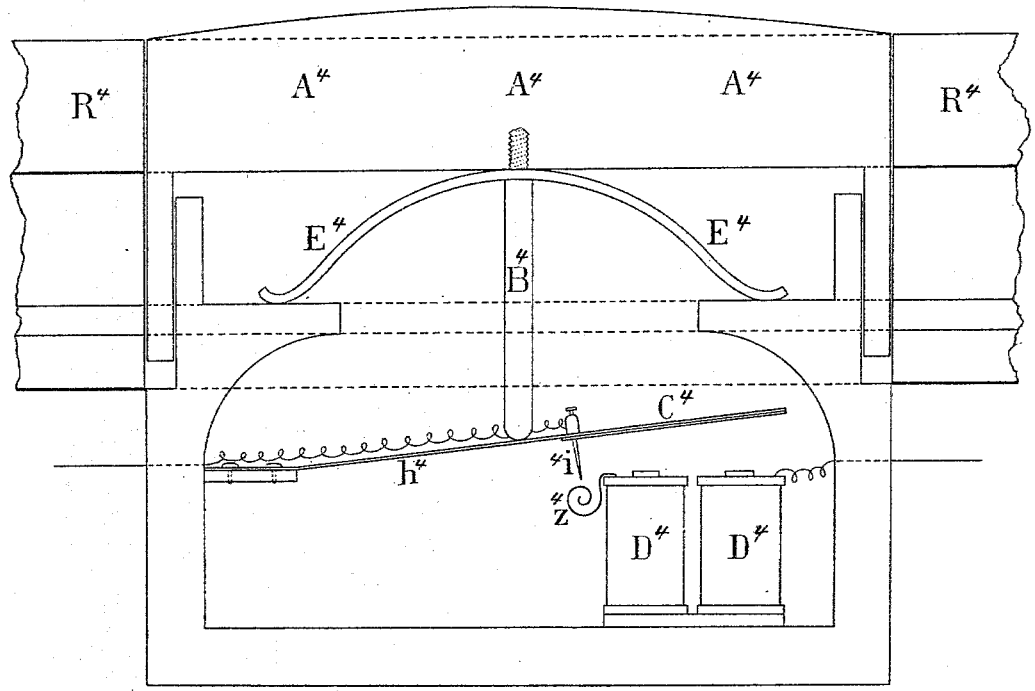
Figure 5:
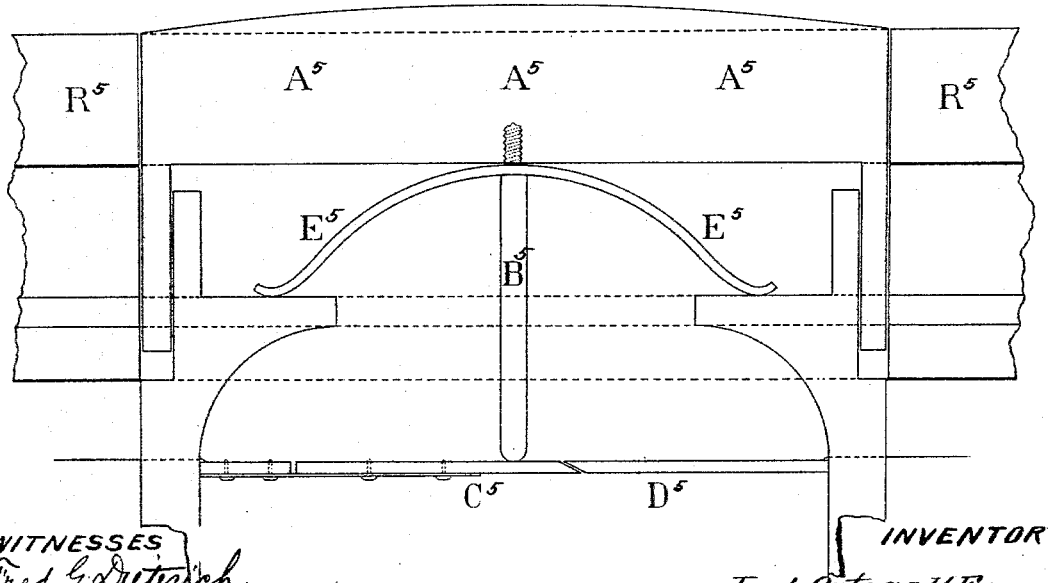

Figure 1 is a front view of one of the signal boxes partly broken away to show the devices within. Figs. 2 and 3 are respectively a side and an end view of the devices within the box or case which are acted upon by the mechanical impact of the train, and which I term a commuter and interrupter, the box or casing being shown in section. Figs. 4 and 5 are side views of modified forms of circuit making and breaking devices which may be used in the place of the device shown in Figs. 2 and 3. Fig. 6 is a side view, Fig. 7 an enlarged detail side view, and Fig. 8 an enlarged cross section through line $x$—$x$ of Fig. 6, showing means for causing the line current to connect or separate contact surfaces on the road bed. Fig. 9 is an end view of the contact devices carried by the engine or car, shown in relation to the contact faces of Fig. 6 on the road bed. Fig. 10 is a side view of the upper part of Fig. 9. Figs. 11, 12 and 13 are diagrammatic views of the circuits, the road bed, and the various devices arranged in proper relation along the same. Figs. 14 and 15 are end and side views respectively of a modification of the device shown in Figs. 9 and 10.

Apparatus Fig. 1:—This apparatus is placed in the station in a very conspicuous point, so that it can be easily consulted by the telegraph operator, and station agent as well as by the conductor and engineer of the train that passes by said station. This apparatus consists of a closed case that, placed against the wall, shows on its outside face four holes, two with white and two with black back ground, and two on the left corresponding to the south line, and the two on the right to that of the north line. The small disks $i$ $i'$, &c., are moved by mechanism entirely analogous so that it will be quite sufficient to describe one of them. The disk $i$ is mounted upon and moved by a lever $o$ $b$ which in its normal position, and abandoned to the simple action of gravity, places the disk away from the opening of the box, taking the position $o$ $b$. The small arm $b$ of said lever leans against a soft iron armature $c$ $d$ which oscillates about a pivot at its bottom end, and this is limited in its oscillation by means of a pin $t$ on one side and on the other by means of the electro magnet A in front of which it is placed; so that when no current passes through the electro magnet the opening that corresponds to it is left unoccupied, and on the contrary, when an electric current passes through it, it attracts the soft iron bar; this acts upon the lever of which I have already spoken and immediately the small disk appears in the opening. It will be well to say here, that the two circuit wires that run to the two electro magnets of the north side start from the batteries placed in the station, (see Fig. 11,) and running over other apparatus that I will in their turn describe, they lastly pass over the electro magnets of the south side of another similar apparatus placed in the nearest station and introduce themselves into the earth so as to complete the two circuits, and thus successively in all the stations of a railroad.

Apparatus Figs. 2 and 3:—This apparatus is placed at the starting point of a station, outside of the yard, and said apparatus is composed of a closed iron plate box that has on its either side two levers A A of wrought iron, joined by two cylinders $p$ $q$ of the same metal that revolve or rock in the journal box formed by the plates B B placed on either side of the case and said levers are held in the vertical position by means of two springs R, symmetrically placed in the interior of the case, and which are secured to the bottom of the case by their lower ends. These springs exercise their tension on two bridges S S' that transversely connect the two cylinders or axes. Above cylinder $q$ is arranged arm F of the bar $B^2 g^2$ which slides vertically and longitudinally in the guide E formed by a box of four sides, two of which sides have openings (viz: the one that is in front of the lever and the opposite one). The latter has an opening $S^2$, so that spring G may immediately press the bar, and the former has two holes or openings, one of which is opposite the pinion D and the other in the upper part with the object of leaving free transit to the arm F in the ascending movement that it has to effect, as we will afterward see. The side of the bar $B^2 g^2$ that faces the center of the figure is formed with ratchet teeth whose horizontal sides are placed downward and in an opposite position to the cogs of the pinion D that have the same form, so that they only mesh and make said pinion turn when the bar descends. This pinion is placed as is seen in the figure on the axis of a fly wheel C, whose weight and size are calculated in such a manner with respect to those of the bar that the latter being lifted to its extreme upper part cannot return to its primitive position without at least two seconds' delay as it has to make said fly wheel turn around. The electric circuit connecting with this part of the apparatus enters by the left side of the figure by the wire $l, l,$ goes to button $n$ placed in the wall of the guide E, as is seen in the drawings, and is in contact with the face of the corresponding bar by means of a small spring $r$, that constantly presses it, and which in its turn establishes the necessary contact to let the current pass. The bar being placed in the lowest position said spring rests against the face of the bar which is made of wood or any other insulating matter. From the button $n$ starts a wire $w$ that takes the current to another button fixed in a bar of soft iron I, which is placed in front of the electro magnet H. This last button perforating the bar presents a point $i$, that, when the same bar is attracted by the electro magnet, is put into contact with the metal sheet $f$, which in its turn transmits the current to the electro magnet to at last go out by the wire $m$ $m$.

Before going any farther I will say that the bar $B^2$, has in its face next to spring G, an inlaid metal plate $S^3$ that extends from point 6 to a point a little below where the spring $r$ rests.

Referring to the spring G, we see that pressing as it does the plate and the spring $r$ of button $n$ being placed in its turn in contact with the same plate, the electric current is therefore transmitted by the first of said springs G and from its point of connection X also goes by the corresponding wire to the plate $f$ to run in its turn to the electro magnet H. On the other side of the box is found a small bar K, arranged in horizontal position, against the end of which leans the lever J, which turns around the point L and which by its own weight is constantly in contact with the bar at the point $g$. On the higher end of the lever there is a tooth $f$ which corresponds to a similar one O that is contained on the cylinder or axis $p$, which cylinder on moving upward makes said tooth $o$ come into contact with tooth $f$ and by this movement throws aside the lever, obliging it to interrupt its contact established at $g$. The current on this side of the apparatus enters from the right side of the box by the wire $e\ e\ e$, connects at point L, going from L to $g$, and communicates with the bar K, at last going out on the left side of the box by the corresponding wire.

Before describing the manner by which this apparatus works, it is well to notice that the electric current that passes through the mechanism of the right side, which I described before, comes from the battery of the station, passes through the electro magnet A of Fig. 11 and runs over the right side of the apparatus which I am describing, and then traverses by the left side of the apparatus of Fig. 2 to work at last upon the electro magnet $A^3$ of Fig. 11 of the corresponding apparatus, which must exist in the other station and directing itself to the ground so as to join the electric current. By this we can now see how the apparatus works. The engine has on the bottom part of its pilot two teeth or bolts symmetrically placed on either side of its middle line exactly the same distance that separates the levers A A of Fig. 3 in such a manner that corresponding with said levers the teeth can move them on passing. The apparatus being placed in the situation already specified, the nearest or starting station being on the right side of the figure the levers are pushed by the teeth of the pilot of the passing engine which placing said levers in the position A', Fig. 2, raises the cylinder $q$ which carries in its ascending movement the arm F, which lifts the bar $B^2 g^2$. In this movement the spring $r$ of the button $n$ (which has been resting on the wooden part of bar) on the ascending of said bar is placed in contact with the metallic plate $S^3$, already mentioned. The current thereby passes, from spring $r$ to G, because both are in contact with the metallic plate. Said current goes to plate $f$, puts the electro magnet in operation which attracting the piece of soft iron I, brings the pin $i$ in contact with said plate and establishes the direct communication of button $n$ with the electro magnet by means of the wire $w$, so that although the cogged bar replaces itself in its primitive position and interrupts the current that passes through G, the circuit is maintained by means of the constant action of the electro magnet, which, working on the armature I continues to establish the contact between $i$ and $f$. The fly wheel and the cogged bar are designed with the object that though the passing of the engine be very rapid, all this mechanism will work equally and at the same time, giving it plenty of time so as to better assure the operation of all these electric currents.

We have already seen what happens when the train starts from the station. We will proceed to see what happens when the train enters the station for which it is directed. By means of the same teeth of the pilot the levers are now moved in contrary directions, and the cylinder $q$ now serving as an axle does not alter in the least the mechanism of the right side, but the cylinder marked with the letter $p$ rises and diverts with the tooth $o$ the lever J and interrupts the contact at $g$, said interruption reacting on the electro magnet H of apparatus Fig. 2 of the starting out station. This releases the armature I of that station and by this means the current in the relative circuit is once again definitely interrupted.

Referring now to Figs. 6, 7 and 8: All along the line of the road are to be found placed in the middle of it in places thought to be most convenient as we will afterward see, certain apparatus whose longitudinal side view is seen in Fig. 6. This apparatus is composed on the upper part, of a sheet of quadrangular hammered iron of fifteen centimeters wide and one hundred in length. Said sheet must be arched in its longitudinal part so as to form a curve of two or three centimeters pitch more or less. Upon this plate are strips $E^7 E^8$ of copper placed parallel lengthwise alongside of each other and separated from each other and from said plate by means of a suitable insulation. These parts, which remain on a level with the rails and parallel with them, cover a subjacent iron box, inside the upper part of which are sustained two electro magnets $B^7 B^7 C^7 C^7$, Fig. 7, which accordingly as the electric current flows through or not, elevate or lower the levers $g^7 h^7 g^8 h^8$ whose fulcrum is in the part $M^7$ of the support in the form of an inverted T. These levers are limited in their movements by the piece $D^7 D^8$ of the T-shaped support and they approach or recede from said electro magnets. Each one of the levers has transversely and near its fulcrum a sheet of copper $Z^7 Z^8$ also seen in Fig. 8, and which on ascending with the lever is placed in contact with a pair of conductors $e^7 e^7$ and $e^8 e^8$ which are separated and that go to communicate with the four plates which I have already referred to, that is to say, $E^7$ and $E^8$ and which are on the upper surface of the same apparatus. The action of each one of the electro magnets corresponds respectively to the right or left pair of said plates and serves to connect them in pairs. The two wires which we have seen depart from the station, which traverse first the apparatus Fig. 1 and secondly the apparatus Fig. 2, also run to that which we are now describing and to all those that resemble it which are distributed along the whole line of the road. A wire connects with all the electro magnets which connect the two plates on the right side, and another wire connects between the plates on the left side. On the engine there must exist two thin bars of quadrangular section solidly sustained and perfectly parallel to the rails, and at an adequate height on such part of the engine as the constructor may think most suitable. Probably the support and position which it would be most desirable to give them, would be to put them on one side of the pilot and on the other extremity under the ash box, being the part that goes nearest the earth. In said bars are inserted the apparatus shown in Figs. 9, 10, 14 and 15 at a distance of ninety or ninety-five centimeters and solidly fixed to said bars. These are contact making devices and they are of two kinds and can be employed indiscriminately. One of said systems is of rolling contact and the other of simple sliding plates. With the first system, the apparatus, the sketch of which is found in Figs. 9 and 10, is formed of a support $M^9$ of wrought iron which is fixed on the bars by means of the square holes $F^9 F^9$. Toward the bottom part it divides into five plates $B^9$, which serve as supports to as many journal boxes of a special disposition as we will afterward see and which are those in which the four wheels $C^9$ turn, the peripheries of which latter are covered by bands of copper the same as the tire of a wheel, and which metal bands are constantly in contact with the plates $L^9$ which bring the current of the two electric batteries which are carried by the engine by means of the wires that are seen in the upper part of the view, and which serve to sound electric bells, which will indicate to the engineer (as we will see farther on) the existence or absence of the currents in the two chief circuits in the whole system. The placing of the plate $L^9$ against the wheels $C^9$ can be better seen in Fig. 10. In this view we can also study the construction of the journal boxes of which I have hitherto made mention. Each of plates $B^9$ has a vertical slot $a^{10} b^{10} c^{10} d^{10}$ in whose bottom part, which is in the shape of a semi-circle, rests one of the ends of the shaft of the wheels, and in the upper part, which is quadrangular, slides a movable block $p^{10} q^{10} r^{10} s^{10}$ which by its rounded lower side completes the circular form of the journal box. This block is continually forced down upon the shaft of the cylinder by means of the spring $R^{10}$ which is placed in a closed case and acts upon the stem $N^{10}$ of the movable block. This combination has for its object that the wheels may the better be applied upon any surface on which they run, and thus establish by this means a more perfect contact. These wheels C C run upon the metal strips $E^7 E^8$ of Figs. 6 and 8 which I have already described and whose respective positions are shown at the bottom part of Fig. 9.

In the place of the rolling contacts, Figs. 9 and 10 the same results can be attained with more economical advantages by sliding contacts as shown in Figs. 14 and 15. The wheels are replaced in this modification by as many simple elastic copper sheets L¹⁴ which slipping upon those of apparatus Fig. 6 do the same work as wheels establishing a direct and close contact with them. To prolong this contact as far as possible (in either system) it is convenient to place three or four of these apparatus or as many as can be placed on the length of the bars which sustain them, separating them by a distance of ninety to ninety-five centimeters as already stated. These four wheels or strips are the two ends of two circuits that come from two electric batteries which the engine carries, each of which passes through an electric bell of different sound and terminates in said wheels or strips. The two ends of one circuit terminate in one pair of said strips or wheels, and the other in the opposite pair, in such a way that placed upon apparatus Fig. 6 and in contact with each of the pair of strips that this apparatus carries, the electric current is established or not according as the strips of the latter apparatus are or are not in electric communication between themselves, which will be immediately revealed to the engineer by the sounding of the bells accordingly as the current does or does not pass through them. It is necessary to note, so as to do away with all kinds of confusion, that the two electric currents that sound the bells, and which are generated by the batteries that the engine carries are completely independent and separated from the others which, going from station to station, run over the various devices that I have before described. The first two have for object as already mentioned to sound their respective bells, giving notice by this means of the communication that exists between the strips of the apparatus Fig. 6, and the others have as their sole object to establish or interrupt this communication.

To make apparatus Fig. 8 more economical, and without diminishing the good result of the entire system, the two outside strips that are placed in the upper part of said apparatus can be replaced by the rails themselves, so that instead of the electro magnets connecting two plates they will connect one of the plates that remain with one of the rails which secures the same result, and the batteries which the engine carries instead of directing its two circuit wires to two of the special contacts on the engine, will direct one wire to one of these contacts, and the other to some of the metal parts of the engine which through the trucks, shafts and wheels make connection with the rails. This modification of course only has two contact wheels or sliding plates on the engine. The description of these devices will enable us to understand how the whole system works.

Fig. 12 represents a diagrammatic illustration of the whole apparatus as follows: $M^a$ is the apparatus Fig. 1, placed in the north station; $M^b$ the corresponding one to the south station. B is apparatus Fig. 2 placed between the rails R' R' and R'' R'' at the starting point of north station. B' is another apparatus Fig. 2 same as the last, also placed between the rails and which corresponds to the entrance of the south station. F F' F'' represent apparatus like those designed in Figs. 6, 7 and 8, and lastly P P P and T T T represent the two circuits which run over the whole system.

Let us suppose that from the south station a train starts. On passing by the apparatus B' the levers are moved and by the same mechanism which I have already explained, a current is transmitted over wire T in the direction of the arrows through the apparatus $M^b$ of the starting out station the electro magnet A, Fig. 1, works and on its black face the white disk $i$ appears, which assures the telegraph operator and station agent that the train has already taken the road that leads to the north. This same electric current working on all the electro magnets which correspond to the right pair of strips of the apparatus F F' F'' scattered on the road establishes the union of said strips between one another in each one of the same apparatus. This will give as a result that when the engine passes by any of them, the contact sheets or wheels, Figs. 9, 10 or 14 and 15, coming into contact with the corresponding ones of the apparatus F F' F'' the electric current will be established in only one of the independent circuits which the engine carries, and (which terminate in the right hand pair of sheets or wheels of the aforesaid pieces), because the communication that exists between the sheets that form the right hand pair of apparatus F has been already established by the action of the corresponding electro magnets. The engineer will hear on passing each one of these the ringing of only one of the bells, which will indicate the existence of the electric current which his engine has established on going out of the station. This same current in the apparatus $M^a$ of the arriving station passing by the electro magnet $A'''$, Fig. 1, will cause to appear on the white face, the black disk $i'''$ and will indicate by this means to the telegraph operator and station agent that the road is occupied by a train that comes from the south. Lastly, when the engine, before arriving at the north station, passes by the other apparatus B and moves the lever in opposite direction, it will again interrupt (as we have already seen) the current and the signal openings on both stations will again become empty, indicating by this means to the employés of the stations, that the road has again become clear. Let us now suppose that before the train arrives at the station, through fault of the employés another enters the road from the opposite station and by this means moving the lever of apparatus B corresponding to the last mentioned station. The current P P P which runs by the wire which is marked by the arrows from left to right will be transmitted and this acting upon the electro magnets corresponding to the left pair of sheets of the apparatus F F' F'' will put them immediately in contact and both engineers will hear, on passing by these apparatus, not only the ringing of one bell, but the ringing of both together, which will indicate to both that the road is occupied by a train coming in the opposite direction, and by this means it is in their power to prevent a collision.

The apparatus B can be replaced, if it is thought fit to do so, by a system of keys whose mechanism is shown in Figs. 4 and 5, one to make the circuit, and the other to interrupt it. The first, Fig. 4, placed longitudinally to the rail is inlaid in the rail $R^4$ $R^4$ and consists of a bar $A^4$ and curved upwardly above the rail so that being pressed by the wheels of the train on passing, it returns to its position by means of the spring $E^4$. On the bar $A^4$ being pressed it forces down by means of the stem $B^4$ the armature $C^4$ which is sustained by an elastic sheet $h^4$ and establishes the contact between the point $i^4$ and the sheet $z^4$. This closes the circuit and, although the stem $B^4$ is lifted again, the contact continues on account of the action of the electro magnet $D^4$ on the bar of soft iron which latter remains in its lower position. The interrupter, Fig. 5, is an apparatus very similar to the preceding one with the difference that the stem $B^4$ works upon a lever $C^5$, which by means of a spring is normally held in contact with the bar $D^5$, $C^5$ and $D^5$ being the two conductor terminals by which the current passes, so that on being pressed by the passing of the train, the bar $A^5$ lowers the lever $C^5$ breaking the contact which affects the electro magnet $D^4$ (apparatus Fig. 4) of the other station. The armature $C^4$ rises and the current is by this means finally interrupted.

The way that these apparatus separate circuit making and breaking devices are to be fixed in the rails is shown in Fig. 13. V V' $V^2$ $V^3$ represent the interrupters and Y Y' the commuters or circuit closers. With this arrangement we will see what happens when a train starts from the south station. Before pressing the bar A (Figs. 4 and 5) it meets the first apparatus F'''', which, if the road in all its course is free, will not make any of the bells ring, since, at this time, there is no current in the wires. On the passing of the train the interrupters or circuit breakers $V^2$ $V^3$, which are placed on both rails nearest the station will work, but have no effect as there is no current yet. But when the last pair of wheels of the train pass the commuter or circuit closer Y' the circuit is closed on the line T flowing from right to left as indicated by the arrows, and now the apparatus F F' F'' F''' will cause the bell, that corresponds to the trains that run from south to north, to ring. On the supposed train arriving at the other station, it will break by means of the interrupter V'. On pressing the commuter Y on the other side a circuit is closed but is again immediately interrupted by the passing of the last wheel over the interrupter V, which is immediately juxtaposed in the same rail. Lastly let us suppose that while the train in question is going over the way, another one not noticing the indications, (which as we have seen, the apparatus $M^a$ in the north station gives) and goes out toward the south; on passing the first apparatus F' it will be given another warning that the road is occupied, for the bell corresponding to the current of the left side will immediately ring in virtue of the communication which has been established by the train coming from the south. If notwithstanding all this it continues its onward course passing the apparatus V V' Y, it is certain that on passing apparatus F' F'', &c., it will have no further indication that another train is coming over the same line in an opposite direction, but in exchange the train that comes from south to north will at once notice that instead of the right hand bell ringing as it had hitherto done, the left one will ring, a thing that will at once indicate that the road is occupied by a train that is coming in the opposite direction, so that even with this system of less perfect interrupters and communicators an unheard of carelessness on the part of the employés would be necessary to cause a collision to happen.

In conclusion I will say, that as in some cases it may be convenient to shut off one of the two general circuits without moving the lever A of the apparatus Fig. 2, a wire from button X may go to the nearest station, so that being connected with a key placed within reach of the employés of said station and arranged in the circuit of the electric battery, a current can be established at will, which passing through the electro magnet H connects the whole circuit which goes to the other station.

Having thus described my invention, what I claim, and desire to secure by Letters Patent, is—

1. The railroad signaling system consisting of two independent electric circuits, the one extending along the line of the road bed and provided with electro magnets controlling the connection of contact faces and commuting or current shifting devices and having also automatically operated electric signals at the stations, and the other electric circuit being carried by the car and having a signal bell and terminating in electrical contacts adapted to come into bearing with those on the road bed, substantially as shown and described.

2. The contact making devices carried by the engine, consisting of a supporting frame $M^9$ provided on each side with holes $F^9$ $F^9$ adapted to slip over bars or bolts on the engine or car and having at its lower portion a set of contacts secured to the frame $M^9$ and connected with circuit wires, substantially as shown and described.

3. The contact making devices carried by the engine, consisting of the combination of supporting frame $M^9$ provided on each side with holes $F^9 F^9$ adapted to slip over bars or bolts on the engine or car, and having also a series of parallel plates $B^9$ with closed slots $a^{10} b^{10} c^{10} d^{10}$ in the same; a series of rolling wheels $C^9$ having their axles carried in said slots, and spring seated journal blocks arranged behind or above the journals of said wheels, substantially as shown and described.

4. The contact making devices for the road bed consisting of a set of curved longitudinal metal strips insulated from each other and provided with downward extensions $e^7 e^8$ and electro magnets and armatures for connecting or separating these strips by the action of said electro magnets, substantially as shown and described.

5. The current changing device for the road bed consisting of the box with tilting levers A A' having axes $p$ and $q$, the cross bars S S' and springs R, the arm F with toothed lift bar, the ratchet and fly wheel for retarding the fall of the lift bar, the electric contact springs G and $r$, the contact breaking devices J K, and the electro magnet H, substantially as shown and described.

6. The signal box having two pairs of openings, the openings of each pair having different colored back ground, four pairs of electro magnets, and four fulcrumed arms bearing signal disks of opposite colors and having elbows or lever extensions loosely connected to the armatures of the electro magnets, substantially as shown and described.

JOSÉ ORTEGA Y ESPINOSA.

Witnesses:
EDWD. W. BYRD,
MANUEL ORTEGA ESPINOSA.